April 5, 1949.  R. B. KNOWLES  2,466,113
PEANUT DIGGER
Filed Aug. 29, 1944  5 Sheets-Sheet 1

Inventor
RUSSELL B. KNOWLES
By [signature]
Attorney

April 5, 1949.   R. B. KNOWLES   2,466,113
PEANUT DIGGER

Filed Aug. 29, 1944   5 Sheets-Sheet 4

Inventor
RUSSELL B. KNOWLES

By *[signature]*
Attorney

April 5, 1949.　　　R. B. KNOWLES　　　2,466,113
PEANUT DIGGER
Filed Aug. 29, 1944　　　　　　　5 Sheets-Sheet 5
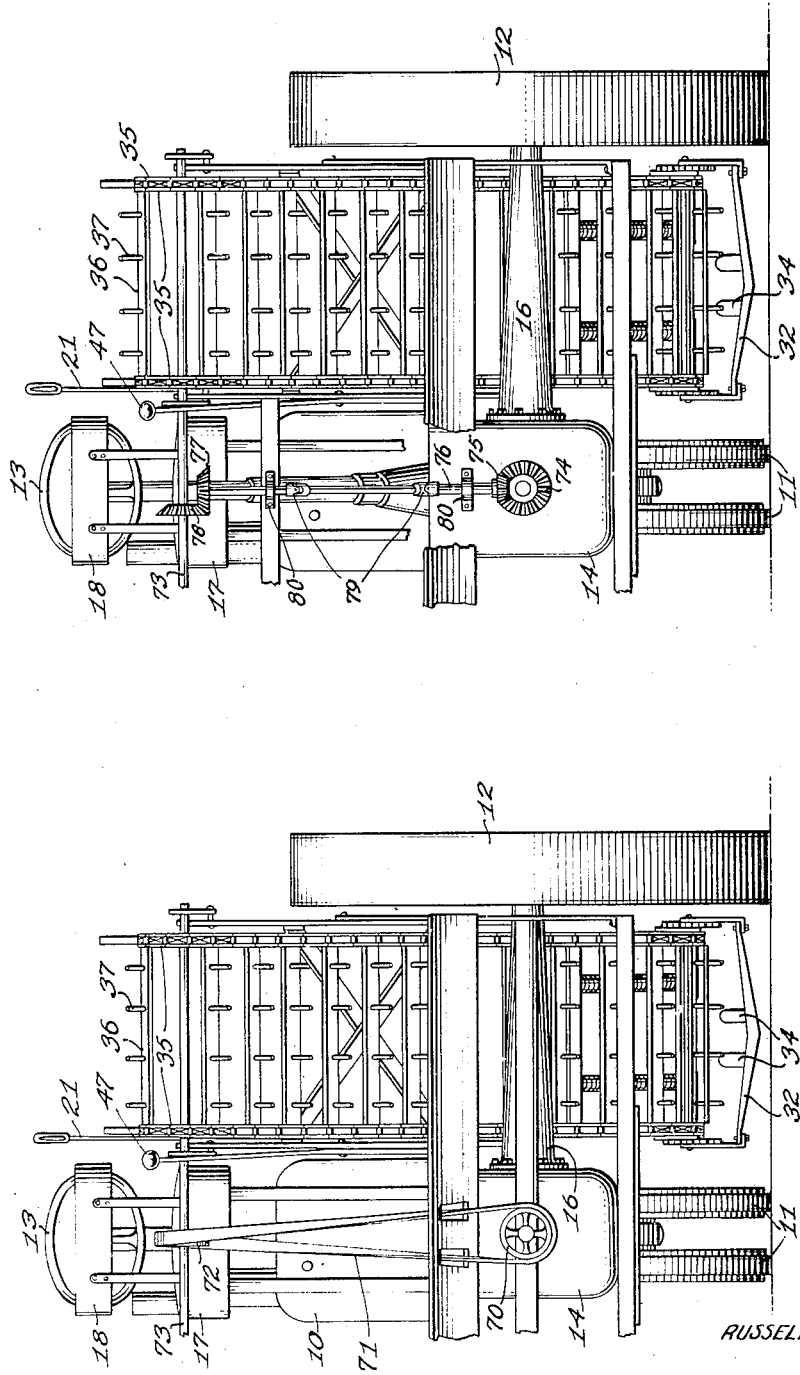
Inventor
RUSSELL B. KNOWLES
By
Attorney

Patented Apr. 5, 1949

2,466,113

UNITED STATES PATENT OFFICE 2,466,113

PEANUT DIGGER

Russell B. Knowles, Windsor, N. C.

Application August 29, 1944, Serial No. 551,730

4 Claims. (Cl. 55—134)

The present invention relates to agricultural implements and more particularly to diggers for digging up peanuts or other products which grow or lie slightly below the surface of the soil.

It has been customary to plow up peanuts with an ordinary turning plow after which the peanut vines have been picked up by hand or by means of a rake. Peanuts grow in light sandy soil near the surface of the soil and consequently plowing up the same with an ordinary turning plow and subsequently picking them up is not satisfactory because this method is too slow and expensive, it being possible for one man to plough up only about an acre of peanuts a day and the peanuts so ploughed up have too much soil left in them.

It is an object of the present invention to provide apparatus for digging peanuts or the like which apparatus has capacity materially beyond anything heretofore accomplished and which is capable of digging up approximately 12 acres per day and shaking off the soil from the vines containing the peanuts as well as depositing the vines in piles.

It is a further object of the invention to provide a simple, inexpensive, and efficient, peanut digger capable of digging up the peanuts in one, two, or more rows and of very great importance one which has a short turning radius so that the machine may be quickly turned at the end of the rows for traversing other rows.

Another object of the invention is to provide a peanut digger which can be managed by a single operator and in connection with a tractor or other propelling vehicle or force.

A further object of the invention is to provide a peanut digger by means of which increased acreage of peanuts may be more satisfactorily harvested with minimum labor as well as a minimum amount retained of soil with the peanut vines.

Figure 1:
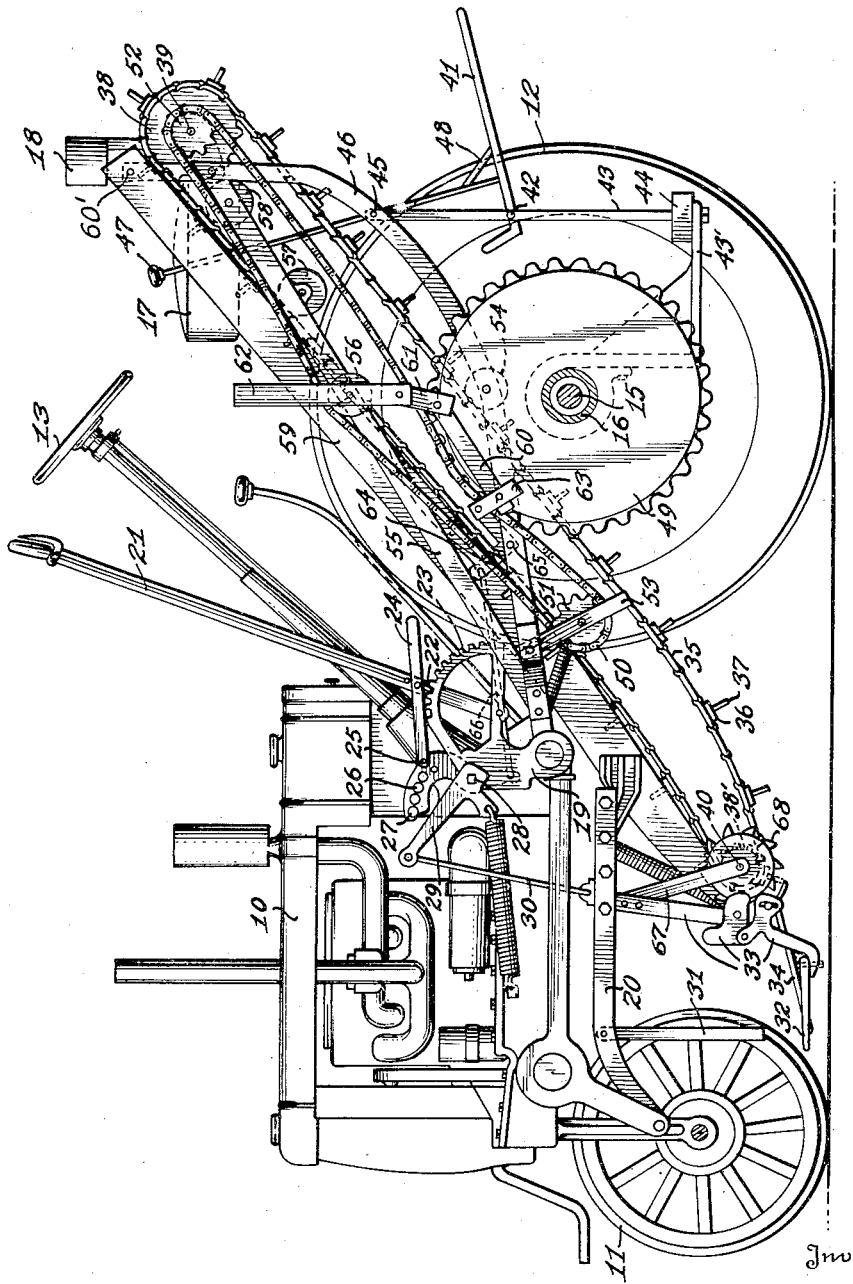
Figure 2:
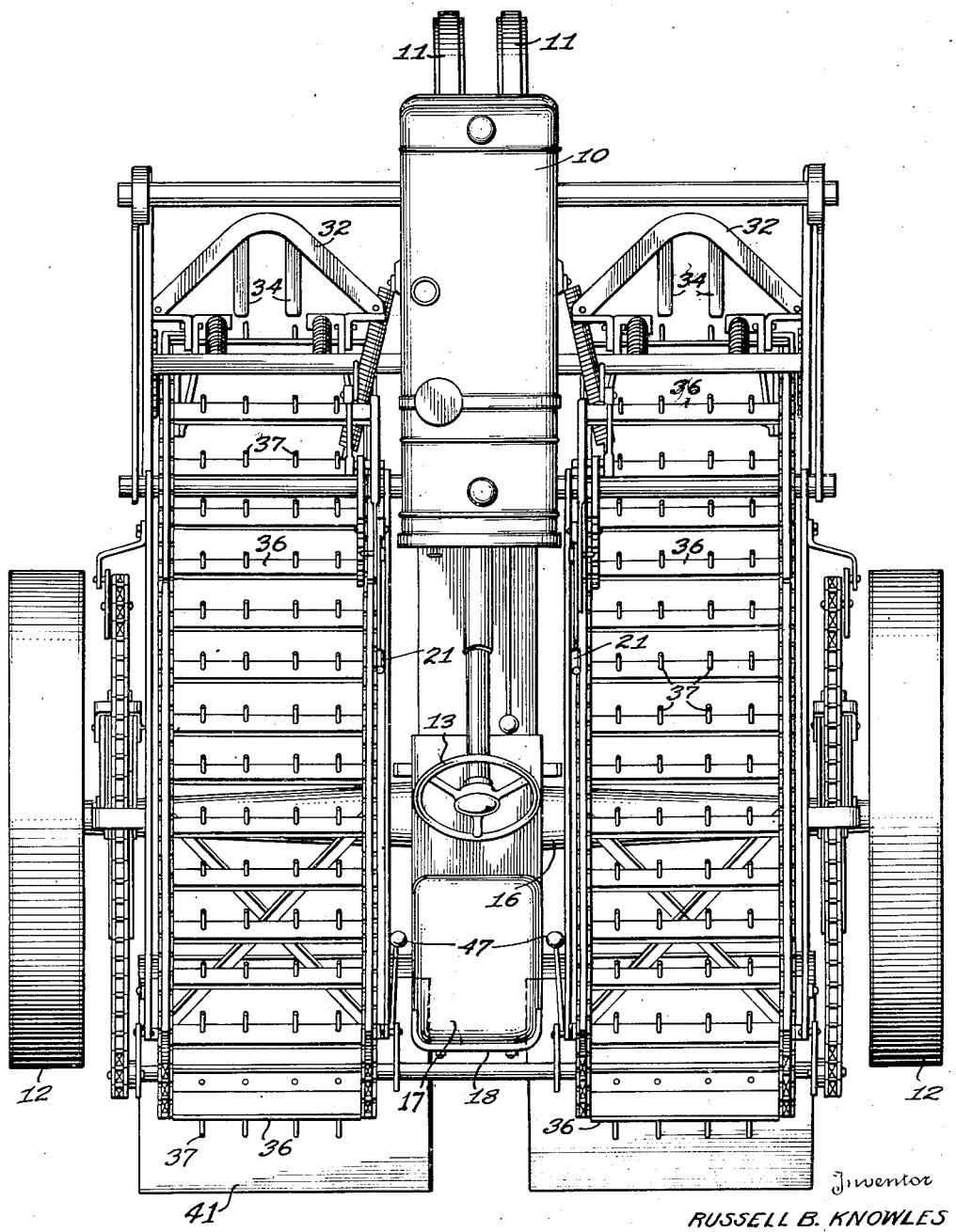
Figure 3:
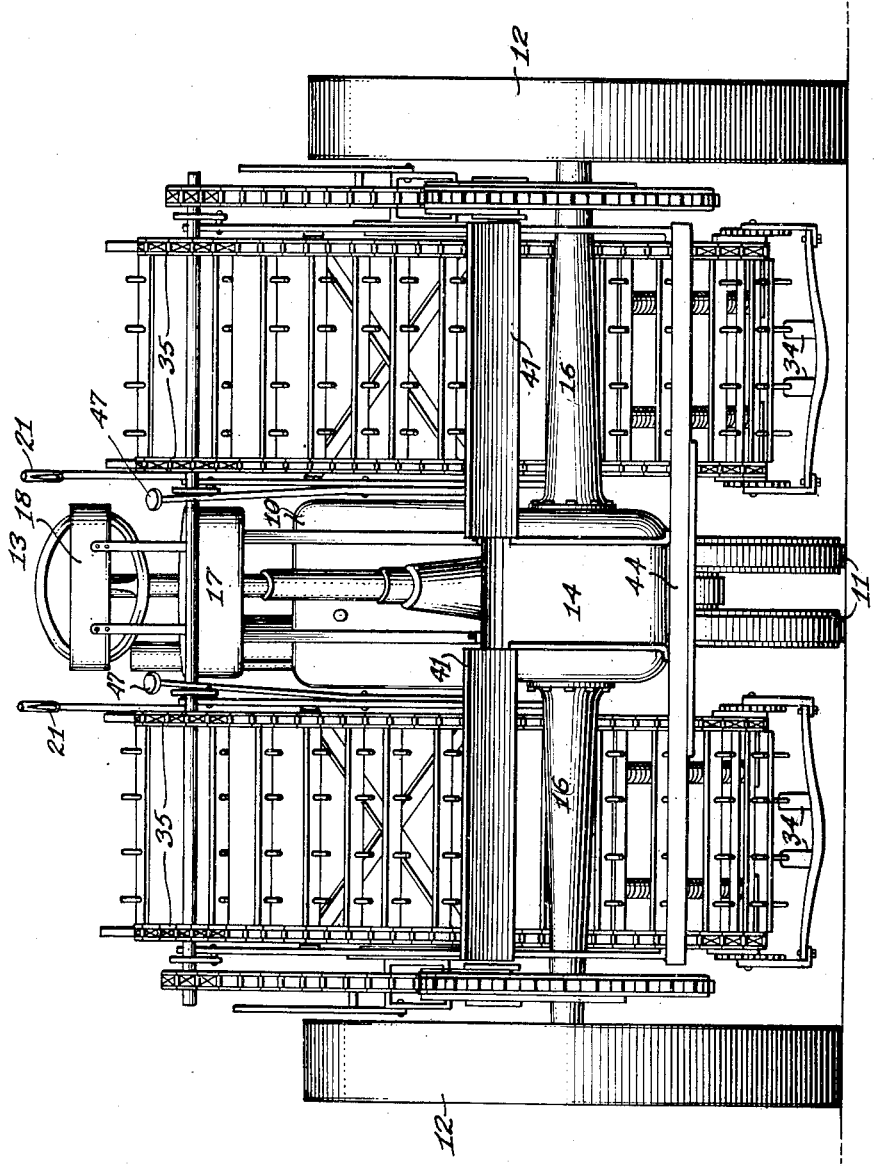
Figure 4:
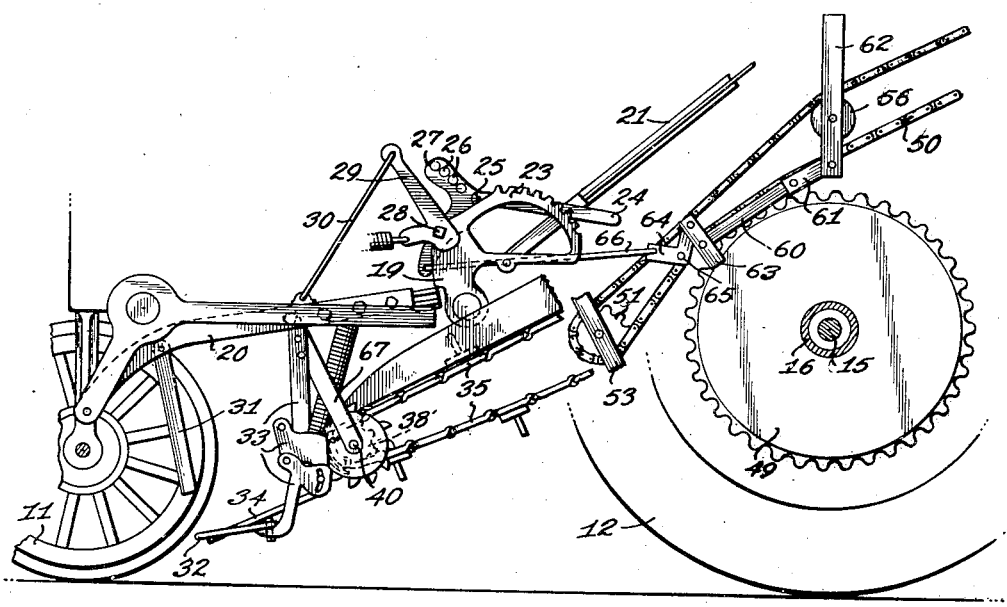
Figure 5:
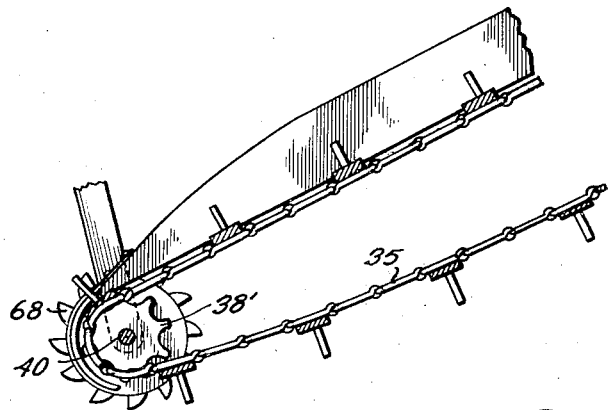

Other objects and advantages of the invention will be apparent from the following specification taken in conjunction with the accompanying drawings, wherein:

Fig. 1 is a side elevation illustrating one application of the invention to one type of tractor or propelling vehicle;

Fig. 2, a top plan view;

Fig. 3, a rear elevation;

Fig. 4, a fragmentary detail illustrating the drive and the release therefor;

Fig. 5, a fragmentary detail illustrating the lower end of the conveyor and the weed cutter;

Fig. 6, a fragmentary rear elevation of a machine with a modified driving connection; and Fig. 7, a view similar to Fig. 6 of a further modified driving connection.

Referring to the drawings, the apparatus may be propelled in any desired manner and is not limited thereby. For example, it may be attached to a tractor to be pushed or pulled thereby or it may be supported on its own wheels.

As shown the apparatus of the invention is applied to a tractor having an engine or motor 10, front wheels 11 and rear wheels 12. Steering of the vehicle is accomplished by a steering wheel 13. The tractor is driven by the motor 10 through a differential 14 (Figs. 3, 6 and 7), driving axle 15 in rear axle housings 16 and the traction wheels 12. The operator may sit upon a seat 17 having a back rest 18.

The tractor is provided with cultivator mechanism, including frame members 19 and 20 for supporting the mechanism by means of which the earth engaging members are supported. A hand lever 21, having a pawl 22 engaging a rack 23, is connected by an operating link 24 and a pivot pin 25 adjustable in apertures 26 in a rocker arm 27 on a pivot 28, and an arm 29 is connected by a link 30 with the frame member 20. By movement of the hand lever 21 the member 20 and earth engaging mechanism can be raised or lowered.

The pivot 28 extends from side to side of the machine and carries 2 of each of the members 29, 30 and 20, one of each pair being disposed adjacent each side of the machine.

The frame members 20, one at each side of the machine, are pivoted at their front ends and are each provided with depending vine or growth contacting and deflecting bars 31. The individual members of each pair of bars 31 are spaced apart and serve to knock the rank growth of peanut vines centrally of the machine in order that they may be readily engaged and picked up by the machine.

In order to dig up the peanut vines one or more digger blades 32 are provided, each being of relatively narrow bar material with their ends attached to the lower ends of 3 part cultivator shanks 33. The shanks 33 are constructed to double back when an obstruction is encountered by the digger blades 32. The members 20 and 33 are of usual construction while the members 31 and 32 are a part of the invention.

The digger blades, of which there may be one, two, or more, are provided with rearwardly and upwardly inclined fixed elevator bars 34 for raising the peanut vines for subsequent engagement by a conveyor 35.

The conveyor 35 is an endless chain, with cross bar 36 having fingers or prongs 37, such chain being mounted on sprockets 38 and 38' on stub shafts 39 and 40 at the upper and lower reaches of the conveyor.

The sprockets 38' are relatively small to provide close contact between the conveyor and the peanut vines which are excavated.

When the peanut vines with the peanuts attached are plowed up by the plow point 32, the vines ride up the elevator bars 34 and are engaged by the fingers or prongs 37 of the conveyor and are carried up the incline rearwardly and deposited by gravity onto a piler 41 where they accumulate until the piler is dumped, the vines with the peanuts thereby being deposited in piles along the path of travel of the tractor.

The piler 41, behind each conveyor, consists of a platform mounted by a pivot 42 on a frame member 43, which frame member has its lower end supported by a bracket or draw bar 43' secured around the rear axle housing 16. A cross bar 44 of wood or the like is mounted transversely of the tractor at the joint between the drawbar and the frame member 43. The upper end of the frame member 43 is secured by a fastener 45 to a frame member 46 and thus the frame member 43 to which the piler is pivoted is held in fixed position. An operating lever 47 is securely and rigidly attached to the piler 41 with the aid of a bracket 48. Thus movement of the lever 47 will move the piler and by a rearward movement the piler can be readily dumped. As illustrated in Figs. 2 and 3, there are two pilers and two operating levers 47 for independent operation although if desired a single operating lever may be employed with consequent decrease in flexibility of the device.

The conveyor chain 35 is driven from the rear axle 15 of the tractor. This drive is accomplished by means of a sprocket wheel 49 engaging a driving chain 50 on sprockets 51 and 52, the latter being fixed to the shaft 39 about which the upper end of the conveyor chain is disposed. Thus upon rotation of the sprocket 49 with the axle of the vehicle the lower reach of the chain 50 will be moved downwardly thus rotating the stub shaft 39 in a clockwise direction, and since the sprocket 38 is likewise attached to the same shaft the sprocket and the conveyor chain will be caused to move in the same direction.

The frame member 46 by means of the bracket 53 supports the sprocket 51 at the lower end of the drive chain 50. This frame member 46 is also provided with an idler 54 over which the conveyor chain 35 passes at each side of the conveyor.

Another frame member 55 provides the idlers 56, 57 and 58, the first of which forms a support for the intermediate portion of the drive chain 50 and the last two of which support the conveyor. Another frame member 59 extends from the lower to the upper end of the conveyor and serves to support and brace the mechanism.

As is clearly illustrated in Figure 1, the frame member 46 is attached at its front end to the tractor through the relatively fixed tractor frame member 19 and extends rearwardly over the drive axle 16. This member is curved upwardly to an extent such that its opposite end portions are almost at right angles to each other and the rear end of the member, when the member is in operative position on a tractor of the type illustrated, is disposed somewhat to the rear of and a considerable distance above the drive axle.

The substantially straight frame member 55 extends across the curvature of the member 46 and is attached at its ends to the member 46 at locations adjacent to the ends of the member 46. This provides a rigid, light-weight trussed frame assembly for supporting the rear end of the conveyor mechanism.

The rear portion of the frame assembly comprising the members 46 and 55 is supported from the crossbar 44 by the frame member or stanchion 43, the crossbar being rigidly supported by the tractor through suitable means such as the draw bar 43'.

At least two parallel trussed frame assemblies are used, one at each side of the tractor. However, where two conveyors are mounted on the tractor, it is preferred to use one of the frame assemblies at each side of each conveyor to give greater rigidity and permit the use of respective stub shafts at the upper ends of the conveyors.

As is further illustrated in Figure 1, stub shaft 40 for conveyor 35 is rotatably supported at the lower end of a bracket 67 depending from cultivator bar 20 while stub shaft 39 is supported in a bracket or brackets carried by the frame assembly comprising the members 46 and 55.

Additional frame members, one of which is indicated at 59 in Figure 1, are also provided to reinforce the conveyor mechanism and add to the general rigidity and improve the durability of the structure. Each of these frame members may comprise a substantially straight, flat element having at its upper rearward end a pivotal connection as indicated at 60' in Figure 1, with the upper rearward end of the frame assembly 46—55. Each reinforcing member extends forwardly and downwardly from its rearward pivotal connection to a connection with lower stub shaft 40 or bracket 64, the lower end of the member being movable up and down by the movable cultivator bar 20.

Preferably one of the reinforcing members is disposed along each side of each elevator.

In order to release the conveyor, so that it will not operate, mechanism is provided which includes (see Figs. 1 and 4) parallel bars 60, one on each side of the lower run of the drive chain. The rear ends of these bars are connected by a pivot to a bracket 61 secured to fixed uprights 62. The front ends are pivoted to links 63 which are pivoted to crank arms 64 mounted on fixed pivots 65, the crank arms being connected by links 66 with the lower extremities of the arm 27 mounted on the pivot 28, the upper end of such arm being adjustably connected by the link 24 with the hand lever 21 for regulating the depth of the plow point 32. Thus when the lever 21 is moved forwardly the pivot shaft 28 is rotated in a contra-clockwise direction, swinging the front end of the lever downwardly and through the link 30 lowering the bar 20 and thus moving downwardly the plow point 32.

Movement of the crank arm will cause the pivots at the ends of the bars 60 to lift the chain 50 which drives the conveyor from contact with its driving gear 49 on the rear axle. The parts then will be in the position shown in Fig. 4 with the conveyor idle and in the reverse position the parts will be as shown in Fig. 1. A bracket 67 is attached to the cultivator shanks 33 adjacent the bar 20 for supporting the stub shaft 40 on which the small conveyor sprocket 38' is mounted. On the stub shaft also is mounted a rotary cutter including a plurality of knives 68, one rotary cutter being located at each side of the conveyor and serving to cut morning glory vines and other appropriate growth.

From the foregoing it would be apparent that the invention embodies plow points which pass beneath the surface of the soil at the properly adjusted depth to cut the tap roots of the peanuts, whereupon the peanut vines with the peanuts attached are deflected upwardly by the elevator bars of the plow points whereupon the prongs 37 on the conveyor catch the peanut vines and carry them up and over the rear end of the conveyor. In this movement of the conveyor, the vines and attached peanuts are given a certain amount of shaking so that they release most of the soil prior to their being dropped onto the piler at the rear of the machine.

During the forward movement of the machine the bars 31 cause the peanut vines to be moved toward the center for engagement by the conveyor and to insure the least likelihood of the vines becoming entangled beyond the sides of the conveyor. The depth of the plow points is controlled by the lever 21 and if a rock or other obstruction is encountered the cultivator shanks 33 will fold up or yield to permit the plow points to ride over the same so that the machine will not be damaged.

As shown in Figs. 6 and 7 the conveyor or conveyors may be driven in a different manner. For example, in Fig. 6, a pulley 70 from a power take-off may drive through a belt 71, a pulley 72 on a conveyor drive shaft 73 which drive shaft 73 may replace the shaft 39 of the structure of Fig. 1.

In lieu of the driving constructions previously described a bevel gear 74 on the power take off may be employed to drive through a pinion 75, a shaft 76. On the opposite end of the shaft 76 is disposed a bevel gear 77 which drives a bevel gear 78 on the conveyor shaft 73. The shaft 76 may be formed of a plurality of sections, there being three illustrated, which sections may be connected by means of universal joints 79, the shaft 76 being mounted in brackets 80.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. An underground crop harvester for assembly with a tractor having front steering wheels, rear driving wheels at the ends of a drive axle, a cultivator support having at its front end a pivotal connection to a fixed portion of said tractor adjacent said front wheels, and manually operable means for raising and lowering the rear end of said support; said harvester comprising bracket means depending from said cultivator support carrying a digger blade and a rotatable stub shaft; a rigid frame member extending upwardly and rearwardly from said stub shaft to a position above and to the rear of said drive axle; a rigid trussed frame connected at its front end to said tractor and extending rearwardly and upwardly to the rear end of said rigid frame member; a pivotal support for the rear end of said frame member carried by said trussed frame; a shaft carried by said trussed frame adjacent its rear end; sprockets on said shaft and said stub shaft; an endless conveyor on said sprockets; and means driving said shaft.

2. An underground crop harvester for assembly with a tractor having steerable front wheels and rear drive wheels carrying a rear drive axle, said harvester comprising an endless chain type conveyor at each side of said tractor extending rearwardly and upwardly from a location adjacent said front wheels to a location above and to the rear of said drive axle; parallel frame members, each comprising a curved member and a substantially straight member secured at its ends to said curved member, secured at their front ends to said tractor and supported at their rear portions from said drive axle supporting the upper rearward ends of said conveyors; reinforcing members extending between the upper rear end portions of said frames and the forward ends of said conveyors, and means driving said conveyors.

3. A frame assembly for mounting an excavating harvester on a tractor having a chassis comprising a pair of similar curved frames independent of said chassis each comprising two members joined at their ends and spaced apart intermediate their ends and additional frame members extending across said curved frames to form a truss, said frames having connection at their front ends with said tractor and having their rear ends disposed above and rearwardly of said tractor; and conveyor reinforcing frame members extending forwardly and downwardly from the rearward ends of said frames said reinforcing frame members being connected at their rearward ends to said frames and at their forward ends to said conveyors.

4. A peanut harvester comprising a power driven vehicle, a pair of spaced relatively broad digging blades, an endless conveyor having its front end disposed adjacent each of said blades and its rear end disposed at an elevation above its front end, said endless conveyor comprising side chains and regularly spaced substantially horizontally disposed cross bars permitting free passage of earth therethrough, means driving said conveyor from said vehicle, means supporting each of the blades from said vehicle raisable and lowerable for gauging the depth of penetration of the blades and supporting means for said conveyors comprising parallel curved frame assemblies each connected at its front end to said vehicle and having its rear end disposed above and to the rear of said vehicle and frame members extending across said curved frames to form a truss, the rear ends of said frame assemblies supporting the rear ends of said conveyors; and reinforcing frame members pivoted at their rear ends to the rear ends of said frame assemblies and connected at their front ends to the front ends of said conveyors, the front ends of said reinforcing members being raisable and lowerable with said blades and the front ends of said conveyors.

RUSSELL B. KNOWLES.

REFERENCES CITED

The following references are of record in the file of this patent:

UNITED STATES PATENTS

| Number | Name | Date |
|---|---|---|
| 669,908 | Williams | Mar. 12, 1901 |
| 1,282,657 | Tussing | Oct. 22, 1918 |
| 1,321,326 | Percivall | Nov. 11, 1919 |
| 1,381,211 | Maulsby | June 14, 1921 |
| 1,516,037 | Boor | Nov. 18, 1924 |
| 1,592,962 | Sample | July 20, 1926 |
| 1,715,198 | Hist | May 28, 1929 |
| 1,921,190 | Johnson | Aug. 8, 1933 |
| 2,027,840 | Rodin | Jan. 14, 1936 |
| 2,080,336 | Powell | May 11, 1937 |
| 2,297,065 | McLendon | Sept. 29, 1942 |